United States Patent [19]

Shulman

[11] Patent Number: 5,663,747

[45] Date of Patent: Sep. 2, 1997

[54] POINTING DEVICE

[75] Inventor: Victor Shulman, Brooklyn, N.Y.

[73] Assignee: Norandor Systems, Inc., Bridgewater, N.J.

[21] Appl. No.: 671,164

[22] Filed: Jun. 26, 1996

Related U.S. Application Data

[63] Continuation-in-part of Ser. No. 551,924, Oct. 23, 1995, abandoned.

[51] Int. Cl.$^6$ ...................................................... G06F 3/033
[52] U.S. Cl. ...................................................... 345/161
[58] Field of Search ................................... 345/161, 160, 345/159

[56] References Cited

U.S. PATENT DOCUMENTS 4,782,327  11/1988  Kley et al. .................. 345/161
5,286,024  2/1994  Winblad ...................... 345/161
5,428,355  6/1995  Jondrow et al. ............. 345/161

*Primary Examiner*—Mark R. Powell
*Attorney, Agent, or Firm*—Thomas L. Adams

[57] ABSTRACT

A pointing device employs a panel mounted at an opening in a keyboard of a computer, such as a portable computer with a hinged display screen. The panel is mounted with freedom to move in two dimensions. A knob projecting from atop the panel has an indicating pushbutton. A sensor mounted adjacent to the panel can produce a motion signal in response to motion of the panel. The panel may be mounted with freedom to rise above the sensor and move in the two dimensions without actuating the sensor. Also, a limit detector may be mounted near the opening to sense arrival of the knob at a border of the opening. A controller coupled to the indicating button and the sensor can provide an encoded signal signifying the motion signal and actuation of the indicating button, and if employed, the limit detector.

26 Claims, 3 Drawing Sheets

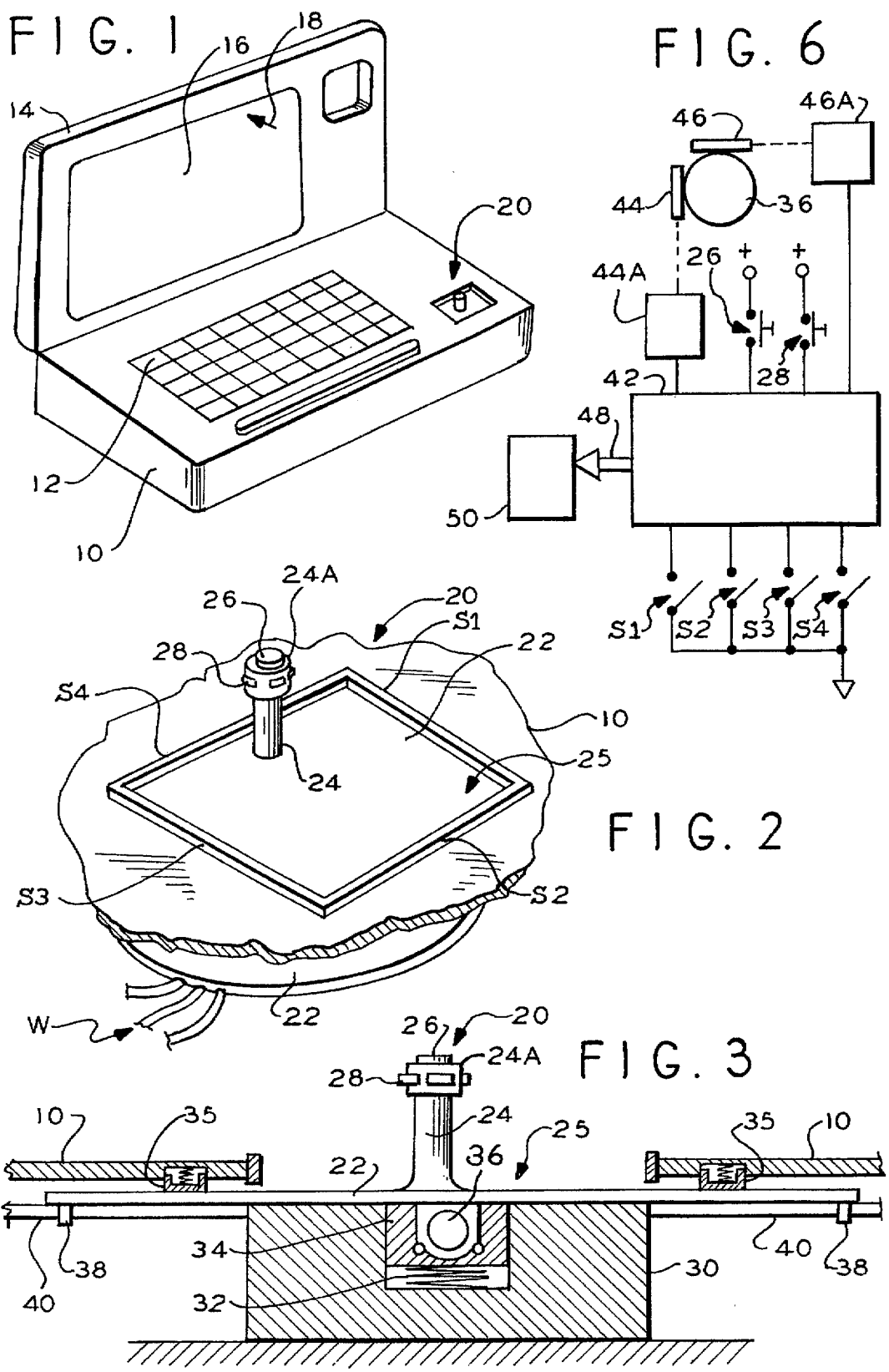

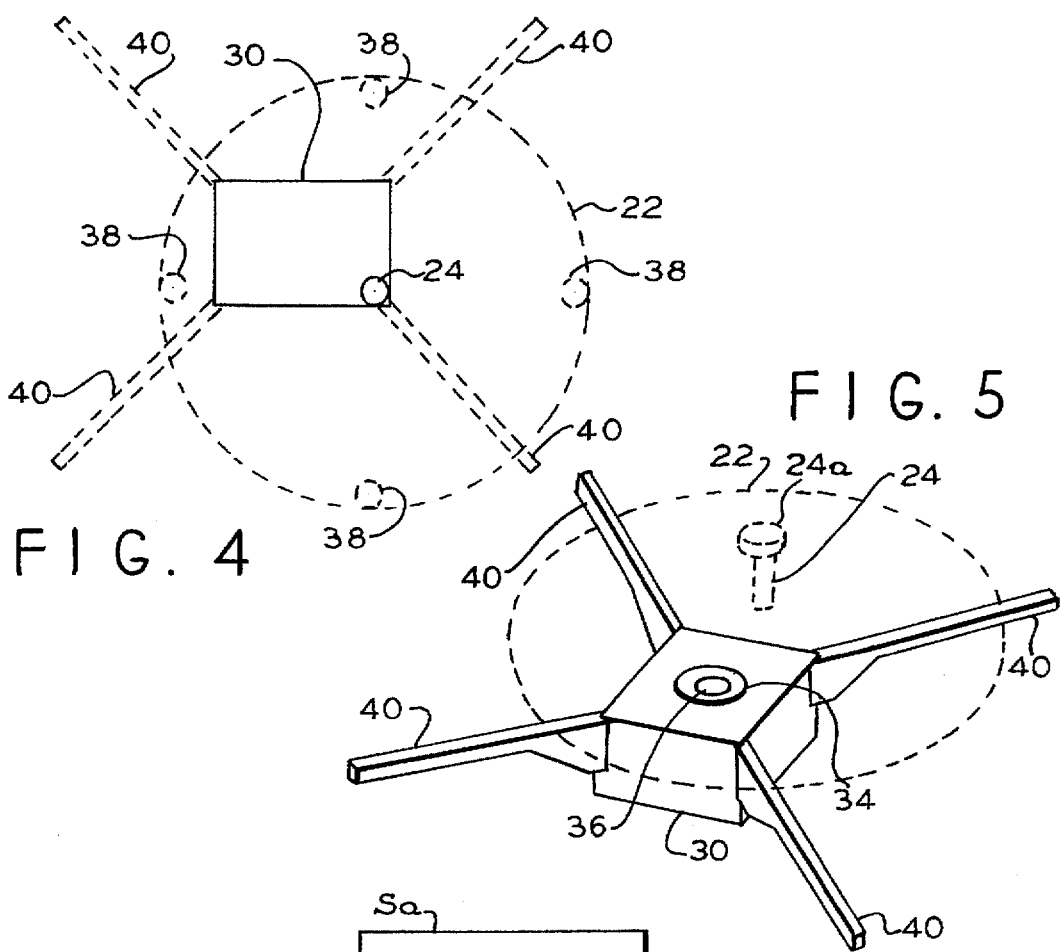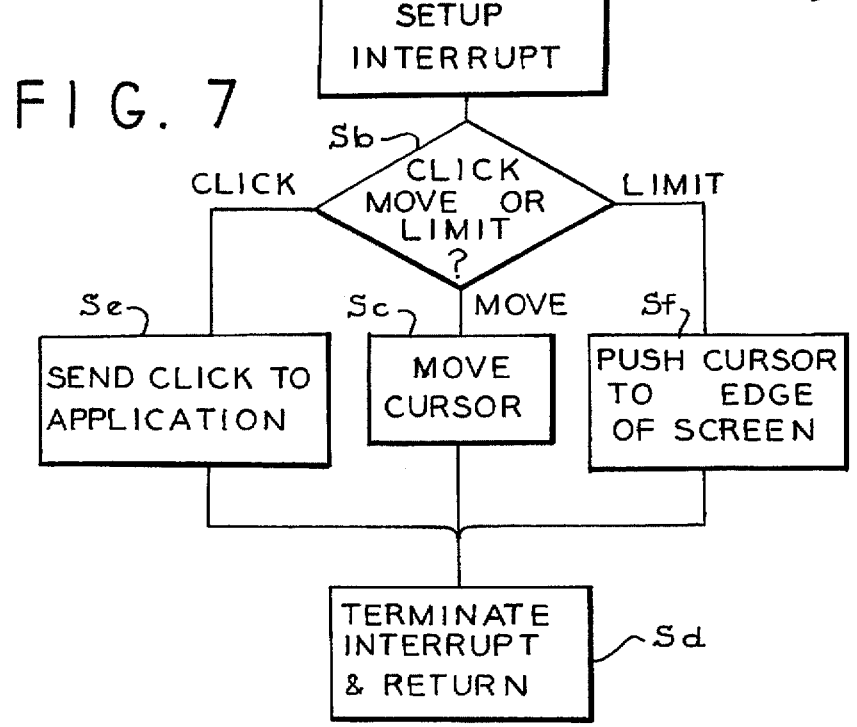

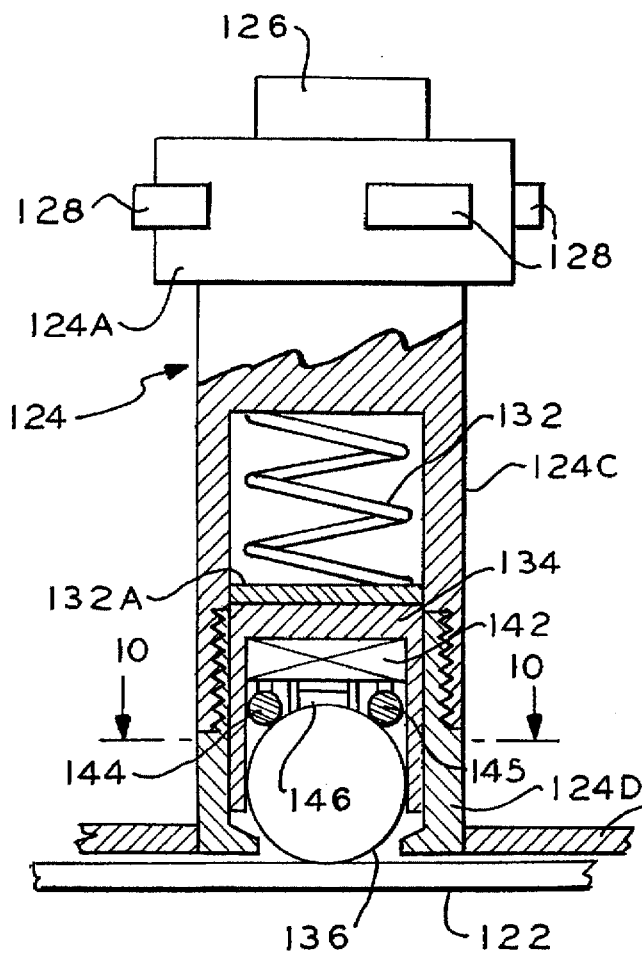
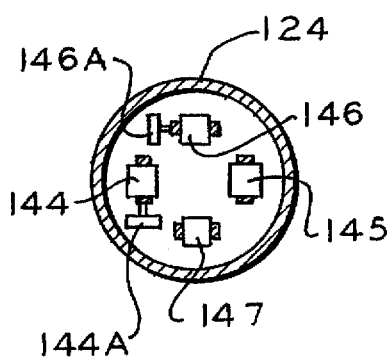
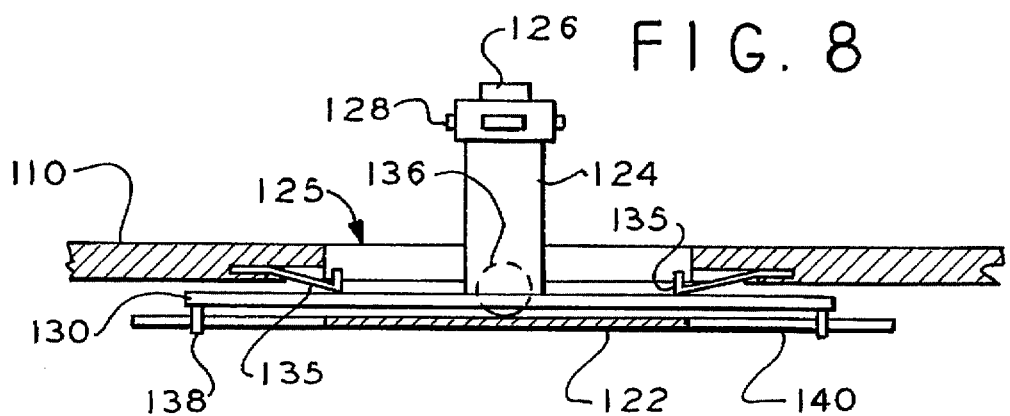

POINTING DEVICE

This is a continuation-in-part application based on a parent application, U.S. Ser. No. 08/551,924, filed Oct. 23, 1995, now abandoned.

BACKGROUND OF THE INVENTION

1. Field of the Invention

The present invention relates to pointing devices for computers, and in particular, to pointing devices having a sliding panel.

2. Description of Related Art

The popular, graphical, user interfaces require a pointing device. The two most commonly used devices are the mouse and the track ball. The mouse can be connected by a cable to a serial port of a computer. The mouse is normally operated on a nearby desktop pad. A mouse is generally inconvenient for use with a portable computer, since such computers attempt to minimize space requirements and may often be operated on the user's lap because a desktop is unavailable. See U.S. Pat. Nos. 5,298,919 and 5,311,208.

A commonly used pointing device for a portable computer is a track ball mounted in the keyboard. The track ball is a sphere mounted to rotate with three degrees of freedom, although only two degrees are measured since the cursor being controlled can only move two dimensionally. A disadvantage with the track ball is the somewhat unnatural need to repetitively stroke the ball to move the cursor across the screen. Also, the track ball lacks the intuitively natural facility of depressing a pushbutton with the index finger at the destination without repositioning the fingers. Instead, track balls normally have a pushbutton spaced from the ball. U.S. Pat. No. 5,309,172 shows a track ball mounted in a computer keyboard. See also U.S. Pat. Nos. 5,341,154 and U.S. Pat. No. 5,386,089.

Another popular type of pointing device is a deflectable knob located between keys on the keyboard of a portable computer. The pointer is moved on the screen in a direction and speed dependent upon the direction and strength with which the deflectable knob is pushed.

U.S. Pat. No. 4,670,743 shows a pointing device in the form of a knob (no "clicking" pushbutton) that can slide in two directions at the top deck of an oversized computer keyboard. The knob is mounted on dual slides that carry dual encoder strips and thus lacks a two dimensionally moveable panel. The arrival of the slider knob to an extreme edge position is sensed and temporarily freezes the cursor while the knob is retracted from the edge. Cursor motion is restored when the knob reverses direction. Still, this reference lacks the ability found in a mouse to be lifted and repositioned while the cursor remains stationary.

U.S. Pat. No. 5,400,054 shows in FIGS. 1–3, a pointing device in the form of a separate accessory with a plate that can slide two dimensionally. The plate is moved by a handle having a pushbutton. Motion of the plate is detected by one or more roller balls. Another function button on the handle can be used to disable the pointing device when retracted, thereby achieving the function performed by lifting and repositioning of a conventional mouse. Keyboard mounting is mentioned at column 7, lines 63–65, apparently referring to an embodiment where the sliding plate is replaced with a fabric stretched around a donut-shaped holder.

See also U.S. Pat. Nos. 4,459,575; 4,795,862; 4,831,736; 4,879,556; 5,245,320; and 5,407,285.

U.S. Pat. Nos. 3,643,148; 4,670,743; 4,748,441; and 5,488,392 were cited in the parent application.

Accordingly, there is a need for a pointing device that can be readily adapted to various computers, including adapting to keyboard mounting in portable computers; while retaining the intuitively natural features of some pointing devices, such a mouse.

SUMMARY OF THE INVENTION

In accordance with the illustrative embodiments demonstrating features and advantages of the present invention, there is provided a pointing device that is mounted at least partially at an opening in a keyboard. The pointing device can affect a display screen of a computer by rendering an effect through its programming. The device includes a panel, mounted at the opening. Also included is a sensor means mounted adjacent said panel for producing a motion signal in response to relative motion between said panel and said sensor means. The sensor means and said panel being are mounted with freedom to separate and allow relative movement therebetween in two dimensions without actuation of said sensor means. The pointing device also has a knob with an indicating button. The knob is mounted at said opening with freedom to move in said two dimensions and cause relative motion between said panel and said sensor means. This knob projects in a transverse direction relative to said panel. Also included is a control means coupled to the indicating button and the sensor means for providing an encoded signal signifying the motion signal and actuation of the indicating button.

In accordance with another aspect of the present invention, a portable computer with a pointing device includes a keyboard having an opening and a display screen hinged to said keyboard. Also included is a panel mounted at said opening. The portable computer also has a sensor means mounted adjacent said panel for producing a motion signal in response to relative motion between said panel and said sensor means. Also included is a knob that has an indicating button. The knob is mounted at said opening with freedom to move in said two dimensions and cause relative motion between said panel and said sensor means. The portable computer also has a control means coupled to said indicating button and said sensor means for providing an encoded signal signifying said motion signal and actuation of said indicating button.

In accordance with still another aspect of the present invention, a pointing device can be mounted at least partially at an opening in a casing to affect a display screen of a computer by rendering an effect through its programming. The pointing device has a panel mounted at said opening. Also included is a sensor means mounted adjacent said panel for producing a motion signal in response to relative motion between said panel and said sensor means. The pointing device also has a knob with an indicating button. The knob is mounted at said opening with freedom to move in said two dimensions and cause relative motion between said panel and said sensor means. Also included is a limit detector mounted near said opening to sense arrival of said knob at a border of said opening. The pointing device also includes a control means coupled to said indicating button and said sensor means for providing an encoded signal signifying said motion signal and actuation of said indicating button.

By employing such structure, an improved pointing device is achieved. In a preferred embodiment, a planar panel has a central, stalk-like knob topped by a vertically depressible, indicating pushbutton. Below this pushbutton a plurality of side pushbuttons encircle the head of the knob. The side pushbuttons are connected in parallel to act as one pushbutton. All of these pushbuttons can be operated while the knob is used to shift the panel in two dimensions. The user can "click" the device by depression the top indicating button with the index finger. A second "clicking" option is provided by the side buttons, which can be operated by squeezing the side pushbuttons between the thumb and middle finger.

The two dimensional motion of the panel is preferably sensed by a spherical sensor, constructed much like a known track ball. Thus the panel motion can rotate the underlying ball to control a cursor on a computer screen.

Preferably, the device includes radial guides that interact with studs on the sliding panel. This limits the permissible turning of the panel in azimuth.

In the preferred embodiment, the knob can be raised to lift the panel off the underlying ball. This allows one to reuse a path already traveled after the knob reaches the border of the opening through which it projects. For example, rightward movement of the cursor may stop when the knob reaches the right border of the opening. But then the knob can be lifted and retracted to the left to allow more rightward motion of the knob and the cursor.

Also in a preferred embodiment, the user can press the knob against the border of an opening in a keyboard. Limit switches at the border sense this pressure and signal the computer to move the cursor to the edge of the display screen, as indicated by the direction of the pressure. Thus, should the user press the knob against the left border of the opening, the cursor on a computer screen will jump to the left edge of the display screen.

BRIEF DESCRIPTION OF THE DRAWINGS

The above brief description as well as other objects, features and advantages of the present invention will be more fully appreciated by reference to the following detailed description of presently preferred, but nonetheless illustrative embodiments, in accordance with the present invention, when taken in conjunction with the accompanying drawings, wherein:

FIG. 1 is an axonometric view of a portable computer having a pointing device in accordance with the principles of the present invention;

FIG. 2 is a detailed, axonometric view of the pointing device of FIG. 1 shown mounted in a fragment of the casing of a keyboard;

FIG. 3 is a cross-sectional, elevational view of the pointing device of FIGS. 1 and 2;

FIG. 4 is a plan view of the pointing device of FIG. 3 showing its panel and guides in phantom;

FIG. 5 is an axonometric view of the guides and supporting block of FIG. 3, with the sliding panel and knob illustrated in phantom;

FIG. 6 is a schematic block diagram of the circuitry for the pointing device FIG. 1 and 2; and FIG. 7 is a flow chart associated with the interrupt handling means of the computer of FIG. 1.

FIG. 8 is an elevational view, partly in section, of a pointing device that is an alternate to that of FIG. 3;

FIG. 9 is a detailed view, partly in section, of the knob and sensor means of FIG. 8; and FIG. 10 is a cross sectional view taken along line 10—10 of FIG. 9.

DETAILED DESCRIPTION OF THE PREFERRED EMBODIMENTS

Referring to FIG. 1, a portable computer is shown with a keyboard 10 having a plurality of conventional keys 12 mounted in a casing. Hinged to keyboard 12 is a display 14 having a screen 16 shown displaying a cursor 18. The screen 16 is rectangular and thus has four edges (also referred to as four sections). While a portable computer is illustrated, the principles of the present invention can also apply to non-portable computers of various sizes and types.

The keyboard 10 has a pointing device 20 which will be described by reference to FIGS. 2 and 3. Pointing device 20 is shown with a panel 22 supporting an upright knob 24. Knob 24 is shown with a generally cylindrical stalk capped by a cylindrical head 24A. Knob head 24A is capped by an indicating button 26. Button 26 is an electrical pushbutton performing a function that will be described presently.

Four peripheral pushbuttons 28 are distributed equiangularly along the circumference 0f knob head 24A. Pushbuttons 28 each perform the same function. Therefore pushbuttons 28 may be four separate buttons electrically connected in parallel. Alternatively, buttons 28 may be mechanically linked to a single electrical contact.

The knob 24 need not have a cylindrical shape but may have a nonsymmetrical shape, and in some embodiments may be ergonomically sculpted to receive the fingertips of the operator. Similarly, the position and number of the various pushbuttons used for clicking can be varied along the body of the knob.

Mounted inside the casing of keyboard 10 and providing underlying support for panel 22 is block-like holder 30. Holder 30 has a cylindrical cavity containing an urging means, shown in the form of a helical compression spring 32. Resting atop spring 32 is a socket 34 having a cavity that holds ball 36, which is part of a sensor means. Ball 36 operates with subsequently described transducers that sense the rotation of ball 36 to provide positional information, much in the manner of a track ball. While the tracking ball 36 is shown centered with respect to the opening in the keyboard deck, in some embodiments the tracking ball can be near or past the border of the opening.

Panel 22 is urged downwardly against holder 30 not only by gravity but by the downward force of spring loaded buttons 35 (also referred to as a depression means). Buttons 35 are mounted on the underside of the upper deck of the casing of keyboard 10.

Referring to FIGS. 3, 4 and 5, panel 22 is shown as a circular disc. Studs 38 are mounted on the underside of panel 22 at four equiangularly spaced, peripheral positions, for engaging guides 40. Guides 40 are shown as four equiangularly spaced arms having upper edges that are coplanar with the top of holder 30. Being arranged in this fashion, panel 22 can only rotate about the axis of knob 24 a limited amount.

Avoiding excessive rotation about the axis of knob 24 is desirable. Ordinarily, a user would not intentionally spin panel 22 along the axis of knob 24. The circumferential motion caused by spinning panel 22 would cause ball 36 to react as if the knob 24 was being moved transversely (either right or left). Another reason for limiting the rotation of panel 22 is to prevent wires W from twisting.

The guides 40 may instead be molded in the body of the keyboard casing. Alternatively, rotation of the sliding panel can be limited by a number of tethers attached between the periphery of the panel 22 and the structure of the keyboard 10.

Referring to FIG. 2, a limit detector is shown herein as four limit switches S1, S2, S3, and S4 at the four borders of rectangular opening (these borders are also referred to as four sections). Limit detectors S1–S4 can be in the form of various extended switches. In one embodiment, the limit detectors included a plurality of spacers sandwiched between a pair of elongated conductors, all embedded in an elastomeric sleeve. When pressure is applied to the sleeve, the conductors are pressed between the spacers into contact. Alternatively, the limit detector can be a reciprocatable bumper mounted to move transversely and actuate a single microswitch. In still another embodiment, the limit detector can employ four electrically conductive laminations along the four borders of opening. Knob 24 can then be metallic (or coated with a conductive layer) and connected to a predetermined potential, so that a circuit is formed when knob 24 contacts the borders of opening.

Pushbuttons 26 and 28 can make electrical connection to other components through wires that are embedded in the body of knob 24 and in the body of panel 22 to produce the wires W shown emerging in FIG. 2. Alternatively, wires W can be affixed or fastened in various ways to one of the surfaces of panel 22.

Referring to FIG. 6, previously mentioned switches S1–S4 are shown as four independent limit switches connected between ground and separate inputs of a control means 42. Control means 42 may have a microprocessor configured to communicate through asynchronous serial communications port 48 to a computer 50, such as the previously illustrated portable computer. Computer 50 contains an element herein referred to as a handling means.

Previously mentioned track ball 36 is shown adjacent a pair of transducers (that is, a transducer means). These transducers include motion sensors in the form of rollers 44 and 46 which are arranged to respond to the pitch and roll of ball 36 (but not yaw). Rollers 44 and 46 cooperate with shaft encoders 44A and 46A, respectively, which are also part of the transducer means. Shaft encoders 44A and 46A produce digital signals signifying the amount of rotation of ball 36. In one embodiment, the output signals of encoders 44A and 46A are a series of pulses produced at a rate proportional to the rate of rotation of the ball 36 along its respective orthogonal axes. In response control means 42 responds to the digital pulses issued by encoders 44A and 46A to produce a serial output through communications port 48. While a single track ball with a pair of orthogonal rollers is illustrated, in other embodiments separate balls may be employed, each ball having only a single roller and shaft encoder.

Also, previously mentioned pushbuttons 26 and 28 are shown connected from positive potential to separate inputs of control means 42. Actuation of switches 26 and 28 will cause a corresponding digital output on communications port 48.

To facilitate an understanding of the principles associated with the foregoing apparatus, its operation will be briefly described with further reference being made to the flowchart of FIG. 7. The user may grasp knob 24 by placing an index finger atop indicating button 26 and the thumb and index finger on either side of knob head 24A, that is, upon pushbuttons 28. To avoid accidentally actuating pushbuttons 28, the operator may instead place the thumb and index finger around the stalk of knob 24, below knob head 24A. The knob 24 can then be moved in two dimensions. Spring loaded buttons 35 press panel 22 downwardly to ensure contact with the ball 36.

With knob 24 positioned as shown in FIG. 2, and with limit switch S4 defined as the top border, knob 24 may be moved left or right. If the knob 24 is moved left or right, roller 44 (FIG. 6) causes shaft encoder 44A to produce a series of pulses. Were the knob 24 moved down (toward limit switch S2 of FIG. 2), then roller 46 (FIG. 6) would actuate shaft encoder 46A to apply pulses to control means 42. Alternatively, the knob 24 could be moved downwardly and to the right to cause both shaft encoders 44A and 46A to simultaneously produce pulses.

In any event, the application of pulses to the control means 42 causes a signal to be sent along communications port 48 to a handling means in the software of the computer 50. Computer 50 senses the receipt of serial data and transfers control to the interrupt handler shown in FIG. 7 (part of the handling means).

In step Sa the handler of FIG. 7 initially stores various vectors and data about the pre-interruption status, so the system can be restored later. With this chore finished the system determines in branching step Sb whether the serial data constitutes a click (depression of one of the pushbuttons on knob 24), movement of knob 24 or actuation of the limit detector (actuation of one of the limit switches S1–S4).

In this instance, the system determines that knob 24 has moved and selects step Sc. In step Sc, the extent of movement is determined and an appropriate signal is stored for the graphics software to reposition the cursor. Thus cursor 18 on screen 16 (FIG. 1) will move in accordance with the motion of knob 24.

The interrupt handler in step Sd restores control to the interrupted application. Essentially, the system recalls the vectors and other status data stored in step Sa and attempts to place all registers and other memory variables to the same state as existed prior to the execution of the interrupt handler.

One of the pushbuttons 26 or 28 (FIG. 2) can also be actuated, an operation referred to as "clicking." Actuation of switches 26 and 28 are sensed by control means 42 (FIG. 6), which then sends serial data sent through port 48 to computer 50 to re-execute the interrupt handler. As before, the interrupt handler executes the set up procedure of step Sa and then determine in step Sb the nature of the new data. In this instance, the operator has "clicked" one of the buttons, which transfers control to step Se. Consequently, the interrupt handler will store an appropriate signal in memory for subsequent use by an interrupted application. Thereafter, step Sd is executed as before.

The operator may push knob 24 against one of the limit switches such as switch S4 (FIG. 2). Closure of switch S4 is detected by control means 42 (FIG. 6), which issues an asynchronous serial signal through part 48 to computer 50, to again call the interrupt handler. The handler of FIG. 7 proceeds as before through steps Sa and Sb eventually transferring controlling to step Sf.

Step Sf recognizes the fact that knob 24 has been pressed to an extreme position in the opening of the keyboard 10. Accordingly, the mouse driver program brings cursor 18 (FIG. 1) to an edge of screen 16. For example, if knob 24 is brought to the right extreme of the opening (FIG. 2), then the cursor 18 will be repositioned to the right edge of screen 16 (FIG. 1). Thereafter, the interrupt is terminated is step Se as before.

In some instances the operator may lift knob 24 to bring panel 22 away from ball 36 (FIG. 3). During this lifting operation the springs of spring loaded button 35 are compressed as panel 22 rises next to the underside of the deck of keyboard 10. This increased elevation of panel 22 is sufficient to separate panel 22 from ball 36. While spring 32 tends to raise ball 36, the amount of travel that spring 32 can produce is limited. Alternatively, a stop (not shown) may be employed so that the upward travel of socket 34 is limited and separation between ball 36 and panel 22 is easily accomplished.

With panel 22 separated from ball 36, knob 24 can be retracted from an extreme position, without rotating ball 36 and therefore without moving cursor 18 (FIG. 1) on screen 16. Thus, when the operator is prevented from moving cursor 18 because knob 24 reached the border of opening, the knob 24 need only be lifted, retracted in the reverse direction and then lowered before proceeding in the original direction. Thus the operator is able to overcome the physical limitations imposed by opening.

Throughout this operation, any rotation about the axis of knob 24 is limited since the studs 38 of panel 22 will run into the guides 40. Thus incidental rotation along the axis of knob 24 will not cause excessive rotation of ball 36 so that the amount of unintended motion of cursor 18 (FIG. 1) is kept small.

Referring to FIGS. 8, 9 and 10, an alternate pointing device is illustrated. Components having a function related to that of the prior embodiment use the same reference numerals, but increased by 100.

An important difference in this embodiment is the location of the sensor means in the knob 124. As before, knob 124 is stalk-like and has a head 124A on which is mounted an indicating button 126. Push-buttons 128 are mounted around the periphery of knob head 124A. Buttons 126 and 128 serve the same function as previously described.

The main body of knob 124 is hollow and contains a ball 136, which is part of a sensor means and operates in a manner similar to the previously illustrated ball (ball 36 of FIG. 3). The stalk portion of knob 124 is formed of an internally threaded upper portion 124C onto which is threaded the externally threaded lower sleeve portion 124D. The lower sleeve portion 124D has a lower lip serving to capture ball 136.

A socket 134 is slidably mounted inside the hollow of knob 124. Socket 134 is a generally cylindrical, cup-shaped member that opens downwardly. A disk 132A rests atop socket 134. A compression spring 132 is mounted between disk 132A and the roof of the hollow of knob 124.

A circuit board assembly 142 is mounted in the upper portion of the hollow of socket 134. Four rollers 144, 145, 146 and 147 are rotatably mounted on the underside of circuit board 142. Rollers 144 and 146 cooperate with shaft encoders 144A and 146A, respectively. As before, the shaft encoders 144A and 146A provide digital signals indicating the extent of rotation of ball 136. Therefore in the usual fashion, ball 136 is equipped to act much like the ball of a mouse or trackball.

Referring to FIG. 8, knob 124 is shown mounted inside an opening 125 in the deck of keyboard 110. The lower portion of knob 124 is attached to a flat flange 130 that is large enough to keep knob 124 from being pulled through opening 125. In this embodiment flange 130 is moveable, but panel 122 is stationary. Flange 130 and panel 122 are circular, although in some embodiments a different outline may be used instead.

Spring clips 135 are mounted in slots located around the periphery of opening 125. Spring clips 135 engage and downwardly depress knob 124 and therefore ball 136. Accordingly, ball 136 is biased against panel 122.

Panel 122 has a number of radially projecting arms 140 that act as stops for the studs 138 that are mounted on the underside of flange 130. Accordingly, knob 124 is constrained from rotating azimuthally through a large angle since studs 138 will eventually be stopped by arms 140.

Since the panel 122 and arms 140 are stationary they can be attached to the structure in various ways. In some embodiments, panel 122 may be a pocket-like structure that is attached along a portion of its periphery to the underside of the deck 110. In other embodiments, the arms 140 (and therefore indirectly panel 122) can be attached by screws or other fastening means to studs or other structure on the underside of deck 110. In still other embodiments, the underside of panel 122 or arms 140 may be subjacently supported by studs, screws, or other fasteners to the floor inside the casing of keyboard 110.

The operation of knob 124 is similar in some respects to knob 24 of the prior embodiment. As before, knob 124 can be moved in two dimensions to cause ball 136 to roll on the panel 122, except now the panel is stationary. This rolling caused by the two dimensional motion is sensed by the shaft encoders 144A and 146A (FIG. 10). Also, the operator can "click" by depressing button 126. Alternate clicking functions can be achieved by depressing pushbuttons 128 instead.

Again, knob 124 can be lifted to lift the ball 136 off panel 122. Under these circumstances, knob 124 can be moved in two dimensions without actuating the sensor means of ball 136. This function is similar to lifting a mouse and retracing a path just traveled.

The periphery of the opening 125 can also be fitted with limit switches (not shown) to perform functions similar to that previously described.

It is to be appreciated that various modifications may be implemented with respect to the above described preferred embodiments. While the various moving and guiding components are preferably made of molded plastic, in some embodiments these components can be made of metals, ceramic, wood or other materials. Also, the various springs can be replaced with elastomeric components or with mechanisms including levers or other devices to apply an urging force. The pointing device is shown mounted in the keyboard, but in some embodiments it may be mounted in the casing of the display or in a separate accessory casing that may be releaseably attachable to the portable computer. Also, the interrupt handler may have additional steps or the illustrated steps may be performed in a different order. Furthermore, the dimensions of the opening in the keyboard and the amount of motion allowed to the knob can be altered depending upon the desired accuracy, available space, etc.

Obviously, many modifications and variations of the present invention are possible in light of the above teachings. It is therefore to be understood that within the scope of the appended claims the invention may be practiced otherwise than as specifically described.

I claim:

1. A pointing device for mounting at least partially at an opening in a keyboard to affect a display screen of a computer by rendering an effect through its programming, comprising:

a panel mounted at said opening;

a sensor means mounted adjacent said panel for producing a motion signal in response to relative motion between said panel and said sensor means, said sensor means and said panel being mounted with freedom to separate and allow relative movement therebetween in two dimensions without actuation of said sensor means, so that said pointing device can be repositioned without affecting said display screen;

a knob having an indicating button and being mounted at said opening with freedom to move in said two dimensions and cause relative motion between said panel and said sensor means, said knob projecting in a transverse direction relative to said panel; and control means coupled to said indicating button and said sensor means for providing an encoded signal signifying said motion signal and actuation of said indicating button.

2. A pointing device according to claim 1 wherein said knob is attached to said panel and said panel is mounted at said opening with freedom to move in two directions.

3. A pointing device according to claim 2 wherein said sensor means comprises:

a ball; and a transducer means for supporting said ball and sensing rotation of said ball.

4. A pointing device according to claim 3 wherein said transducer means comprises:

a pair of transducers oriented to sense rotation of said ball about two orthogonal axes to produce said motion signal as a pair of orthogonal signals.

5. A pointing device according to claim 3 comprising:

a socket for holding said ball;

a holder for holding said socket and allowing said socket to reciprocate with a vertical component of motion; and urging means for urging said socket upwardly.

6. A pointing device according to claim 1 wherein said knob is attached to said control means and said control means is mounted at said opening with freedom to move in two directions.

7. A pointing device according to claim 6 wherein said sensor means comprises:

a ball; and a transducer means for supporting said ball and sensing rotation of said ball.

8. A pointing device according to claim 7 wherein said transducer means comprises:

a pair of transducers oriented to sense rotation of said ball about two orthogonal axes to produce said motion signal as a pair of orthogonal signals.

9. A pointing device according to claim 7 comprising:

a socket for holding said ball;

a holder for holding said socket and allowing said socket to reciprocate with a vertical component of motion; and urging means for urging said socket upwardly.

10. A pointing device according to claim 1 comprising:

a side button mounted on said knob below said indicating button.

11. A pointing device according to claim 10 wherein said indicating button is positioned atop said knob for actuation by depression, said side button being mounted for actuation by manually squeezing said side button.

12. A pointing device according to claim 11 wherein said side button comprises a plurality of peripheral pushbuttons, each being alternately operable to cause the same effect.

13. A pointing device according to claim 1 comprising:

at least one guide mounted in said keyboard for engaging and limiting the extent of rotation of said panel.

14. A pointing device according to claim 13 comprising:

at least one stud projecting from said panel for engaging said guide and limiting the extent of rotation of said panel.

15. A pointing device according to claim 1 comprising:

a plurality of radially extending guides mounted in said keyboard; and a plurality of studs projecting from said panel for engaging said guide and limiting the extent of rotation of said panel.

16. A pointing device according to claim 1 comprising:

depression means mounted at said keyboard for mechanically biasing said panel downwardly.

17. A portable computer having a pointing device comprising:

a keyboard having an opening;

a display screen hinged to said keyboard;

a panel mounted at said opening;

a sensor means mounted adjacent said panel for producing a motion signal in response to relative motion between said panel and said sensor means, said sensor means and said panel being mounted with freedom to separate and allow relative movement therebetween in two dimensions without actuation of said sensor means, so that said pointing device can be repositioned without affecting said display screen;

a knob having an indicating button and being mounted at said opening with freedom to move in said two dimensions and cause relative motion between said panel and said sensor means; and control means coupled to said indicating button and said sensor means for providing an encoded signal signifying said motion signal and actuation of said indicating button.

18. A pointing device for mounting at least partially at an opening in a casing to affect a display screen of a computer by rendering an effect through its programming, comprising:

a panel mounted at said opening;

a sensor means mounted adjacent said panel for producing a motion signal in response to relative motion between said panel and said sensor means;

a knob having an indicating button and being mounted at said opening with freedom to move in said two dimensions and cause relative motion between said panel and said sensor means;

a limit detector spaced from said sensor means and mounted near said opening to sense arrival of said knob at a border of said opening independently of said motion signal;

control means coupled to said indicating button and said sensor means for providing an encoded signal signifying said motion signal and actuation of said indicating button.

19. A pointing device according to claim 18 wherein said encoded signal signifies said motion signal and actuation of said limit detector and said indicating button.

20. A pointing devise according to claim 19 comprising:

handling means coupled to said control means for affecting the programming of said computer and repositioning said cursor to an edge of said screen in response to said encoded signal signifying actuation of said limit detector.

21. A pointing device according to claim 20 wherein said limit detector comprises:

four independent switches for sensing arrival of said knob at one of four sections of the border of said opening, said handling means being operable to reposition said cursor to one of four sections of the edge of said screen in response to said encoded signal signifying actuation of one of said switches of said limit detector.

22. A pointing device according to claim 18 wherein said panel and said sensor means are mounted with freedom to separate and allow relative movement therebetween in said two dimensions without actuation of said sensor means.

23. A pointing device according to claim 22 wherein said sensor means comprises:
   a ball; and
   a transducer means for supporting said ball and sensing rotation of said ball.

24. A pointing device according to claim 18 comprising:
   a side button mounted on said knob below said indicating button.

25. A pointing device according to claim 24 wherein said indicating button is positioned atop said knob for actuation by depression, said side button being mounted for actuation by manually squeezing said side button.

26. A pointing device according to claim 18 comprising:
   a plurality of radially extending guides mounted in said casing; and
   a plurality of studs projecting from said panel for engaging said guide and limiting the extent of rotation of said panel.

* * * * *